(12) United States Patent
Madsen et al.

(10) Patent No.: US 10,668,672 B2
(45) Date of Patent: Jun. 2, 2020

(54) RADIALLY EXTENDING COMPOSITE STRUCTURES

(71) Applicant: Northrop Grumman Innovation Systems, Inc., Plymouth, MN (US)

(72) Inventors: Christopher J. Madsen, Ogden, UT (US); Eric McNabb, Syracuse, UT (US); John B. Healey, South Weber, UT (US); Todd Rosevear, Taylorsville, UT (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 299 days.

(21) Appl. No.: 15/604,493

(22) Filed: May 24, 2017

(65) Prior Publication Data

US 2017/0252983 A1    Sep. 7, 2017

Related U.S. Application Data

(62) Division of application No. 12/615,980, filed on Nov. 10, 2009, now Pat. No. 9,662,841.

(51) Int. Cl.
| | | |
|---|---|---|
| *B29C 70/32* | (2006.01) | |
| *B29C 70/20* | (2006.01) | |
| *B29C 70/34* | (2006.01) | |
| *B64C 3/18* | (2006.01) | |

(Continued)

(52) U.S. Cl.
CPC .......... *B29C 70/32* (2013.01); *B29C 70/207* (2013.01); *B29C 70/34* (2013.01); *B29C 53/585* (2013.01); *B64C 1/06* (2013.01); *B64C 1/064* (2013.01); *B64C 3/182* (2013.01); *Y10T 156/1043* (2015.01); *Y10T 428/13* (2015.01)

(58) Field of Classification Search
CPC .............. B29C 70/32; B29C 66/73753; B29C 66/7375; B29C 53/56; B29C 53/562; B29C 53/566; B29C 53/58; B29C 53/582; B29C 53/583; B29C 53/585; B29C 53/60; B64C 1/00; B64C 1/06; B64C 1/064; B64C 1/065; B64C 3/00; B64C 3/18; B64C 3/182; B64C 3/187; C08J 5/24
USPC ...................................... 156/307.1
See application file for complete search history.

(56) References Cited

U.S. PATENT DOCUMENTS

| | | | |
|---|---|---|---|
| 1,452,742 | A | 4/1923 | Johnston |
| 1,669,324 | A | 5/1928 | Brown |
| 2,938,566 | A | 5/1960 | Toulmin |

(Continued)

FOREIGN PATENT DOCUMENTS

| | | |
|---|---|---|
| FR | 1554899 | 1/1969 |
| JP | 5839845 | 9/1981 |

(Continued)

OTHER PUBLICATIONS

Examiner's Report for Canadian Application No. 2,698,272, dated Jul. 2, 2015, 4 pages.

(Continued)

*Primary Examiner* — Carson Gross
(74) *Attorney, Agent, or Firm* — TraskBritt

(57) ABSTRACT

A composite structure having at least one radially extending part is provided. The composite structure is formed with ply layers. At least one of the ply layers used to form the radially extending part has fibers oriented at an angle offset from an edge of the at least one ply layer.

19 Claims, 10 Drawing Sheets

(51) Int. Cl.
   *B29C 53/58* (2006.01)
   *B64C 1/06* (2006.01)

(56) References Cited

U.S. PATENT DOCUMENTS

| | | | |
|---|---|---|---|
| 2,979,431 A | 4/1961 | Perrault | |
| 3,220,061 A | 11/1965 | Myles | |
| 3,300,355 A | 1/1967 | Adams | |
| 3,616,072 A | 10/1971 | Bostrom | |
| 3,669,324 A | 6/1972 | Landoni | |
| 3,962,394 A | 6/1976 | Hall | |
| 3,995,080 A | 11/1976 | Cogburn et al. | |
| 3,995,081 A | 11/1976 | Fant et al. | |
| 4,151,031 A | 4/1979 | Goad et al. | |
| 4,244,994 A | 1/1981 | Trainor et al. | |
| 4,278,738 A | 7/1981 | Brax et al. | |
| 4,294,490 A | 10/1981 | Woelfel | |
| 4,310,132 A | 1/1982 | Frosch et al. | |
| 4,357,193 A | 11/1982 | McGann et al. | |
| 4,410,383 A | 10/1983 | Lipari | |
| 4,475,976 A | 10/1984 | Mittelstadt et al. | |
| 4,519,285 A | 5/1985 | Dontscheff | |
| 4,548,859 A | 10/1985 | Kline et al. | |
| 4,559,005 A | 12/1985 | Gants et al. | |
| 4,622,091 A | 11/1986 | Letterman | |
| 4,861,406 A | 8/1989 | Baker et al. | |
| 4,946,526 A | 8/1990 | Petty-Galis et al. | |
| 4,997,510 A | 3/1991 | Shinno et al. | |
| 5,026,447 A | 6/1991 | O'Connor | |
| 5,039,371 A | 8/1991 | Cremens et al. | |
| 5,043,128 A | 8/1991 | Umeda | |
| 5,076,873 A | 12/1991 | Lowery | |
| 5,076,880 A | 12/1991 | Spengler et al. | |
| 5,102,609 A | 4/1992 | Miller et al. | |
| 5,137,071 A | 8/1992 | Ashton et al. | |
| 5,151,236 A | 9/1992 | Azzara et al. | |
| 5,182,060 A | 1/1993 | Berecz | |
| 5,211,901 A | 5/1993 | Fray | |
| 5,292,475 A | 3/1994 | Mead et al. | |
| 5,368,807 A | 11/1994 | Lindsay | |
| 5,451,377 A | 9/1995 | Asher et al. | |
| 5,484,277 A | 1/1996 | Lindsay | |
| 5,502,886 A | 4/1996 | Jensen et al. | |
| 5,538,589 A | 7/1996 | Jensen et al. | |
| 5,543,199 A | 8/1996 | Fell | |
| 5,593,633 A | 1/1997 | Dull et al. | |
| 5,609,806 A | 3/1997 | Walsh et al. | |
| 5,632,940 A | 5/1997 | Whatley | |
| 5,639,410 A | 6/1997 | Amaike et al. | |
| 5,681,513 A | 10/1997 | Farley | |
| 5,688,577 A | 11/1997 | Smith et al. | |
| 5,707,576 A | 1/1998 | Asher | |
| 5,738,749 A | 4/1998 | Grimshaw et al. | |
| 5,792,487 A | 8/1998 | Wenning et al. | |
| 5,820,804 A | 10/1998 | Elmaleh | |
| 5,882,462 A | 3/1999 | Donecker et al. | |
| 5,891,379 A | 4/1999 | Bhattacharyya et al. | |
| 5,954,917 A | 9/1999 | Jackson et al. | |
| 5,959,031 A | 9/1999 | Thurgood | |
| 6,027,786 A | 2/2000 | Ford | |
| 6,071,458 A | 6/2000 | Mossi | |
| 6,096,669 A | 8/2000 | Colegrove et al. | |
| 6,114,012 A | 9/2000 | Amaoka et al. | |
| 6,164,604 A | 12/2000 | Cirino et al. | |
| 6,355,133 B1 | 3/2002 | Williams | |
| 6,413,461 B1 | 7/2002 | Kobayashi et al. | |
| 6,432,236 B1 | 8/2002 | Leemon et al. | |
| 6,540,867 B1 | 4/2003 | Cochran | |
| 6,544,366 B2 | 4/2003 | Hamilton et al. | |
| 6,585,842 B1 * | 7/2003 | Bompard | B29C 70/202 |
| | | | 156/166 |
| 6,699,419 B1 | 3/2004 | Kia et al. | |
| 6,702,970 B2 | 3/2004 | Klug | |
| 6,739,861 B2 | 5/2004 | Cournoyer et al. | |
| 6,743,127 B2 | 6/2004 | Eggiman et al. | |
| 6,998,165 B2 | 2/2006 | Howland | |
| 7,138,167 B2 | 11/2006 | Sakonjo et al. | |
| 7,175,795 B2 | 2/2007 | Eberth et al. | |
| 7,249,943 B2 | 7/2007 | Benson et al. | |
| 7,335,012 B2 | 2/2008 | Blanton et al. | |
| 7,469,735 B2 | 12/2008 | Brown et al. | |
| 7,513,769 B2 | 4/2009 | Benson et al. | |
| 7,527,222 B2 | 5/2009 | Biomstad et al. | |
| 7,767,128 B2 | 8/2010 | Benson et al. | |
| 7,819,651 B2 | 10/2010 | Benson et al. | |
| 7,820,092 B2 | 10/2010 | Bensen et al. | |
| 7,824,171 B2 | 11/2010 | Hanson et al. | |
| 8,282,757 B2 | 10/2012 | Madsen et al. | |
| 8,366,981 B2 | 2/2013 | Benson et al. | |
| 9,090,028 B2 * | 7/2015 | McCarville | B29C 70/30 |
| 2001/0001409 A1 | 5/2001 | Weight et al. | |
| 2002/0144401 A1 | 10/2002 | Nogueroles Vines et al. | |
| 2003/0079825 A1 | 5/2003 | Gardner et al. | |
| 2003/0168775 A1 | 9/2003 | Ulrich et al. | |
| 2003/0175520 A1 | 9/2003 | Grutta et al. | |
| 2004/0145095 A1 | 7/2004 | McCollum et al. | |
| 2005/0056362 A1 * | 3/2005 | Benson | B29C 70/388 |
| | | | 156/163 |
| 2005/0144780 A1 | 7/2005 | Hishimoto et al. | |
| 2005/0144870 A1 | 7/2005 | Hishimoto et al. | |
| 2006/0249868 A1 | 11/2006 | Brown et al. | |
| 2007/0029038 A1 | 2/2007 | Brown et al. | |
| 2007/0289699 A1 | 12/2007 | Benson et al. | |
| 2008/0048359 A1 | 2/2008 | Krogager et al. | |
| 2008/0054122 A1 | 3/2008 | Bold | |
| 2008/0289747 A1 | 11/2008 | Modin et al. | |
| 2009/0044914 A1 | 2/2009 | Pham et al. | |
| 2009/0071592 A1 | 3/2009 | Benson et al. | |
| 2009/0071597 A1 | 3/2009 | Benson et al. | |
| 2009/0078362 A1 | 3/2009 | Wilkerson et al. | |
| 2009/0081443 A1 | 3/2009 | Benson et al. | |
| 2009/0110879 A1 | 4/2009 | Lewis et al. | |
| 2009/0130450 A1 | 5/2009 | Anderson et al. | |
| 2009/0176066 A1 | 7/2009 | Darrow et al. | |
| 2010/0166998 A1 | 7/2010 | Bannister et al. | |
| 2010/0266833 A1 | 10/2010 | Day et al. | |
| 2011/0000311 A1 | 1/2011 | Petroff | |
| 2011/0003111 A1 | 1/2011 | Benson et al. | |
| 2011/0111148 A1 | 5/2011 | Madsen et al. | |
| 2011/0108189 A1 | 12/2011 | Madsen et al. | |
| 2013/0000825 A1 | 1/2013 | Madsen et al. | |

FOREIGN PATENT DOCUMENTS

| | | |
|---|---|---|
| JP | 62119027 | 5/1987 |
| JP | 64004315 | 1/1989 |
| JP | 3083624 | 4/1991 |
| JP | 3126532 | 5/1991 |
| JP | 4062142 | 2/1992 |
| JP | 5050571 | 3/1993 |
| JP | 10315339 | 2/1998 |
| JP | 2005059260 | 3/2005 |
| JP | 2006069166 | 3/2006 |
| JP | 2008184155 | 8/2008 |
| JP | 2008184156 | 8/2008 |
| JP | 2011509200 | 3/2011 |
| WO | 9952698 | 10/1999 |
| WO | 37244 | 6/2000 |
| WO | 2005011961 | 2/2005 |
| WO | 2006119002 | 11/2006 |
| WO | 2007018935 | 2/2007 |
| WO | 2008019894 | 2/2008 |
| WO | 2009049737 | 4/2009 |
| WO | 2009052598 | 4/2009 |
| WO | 2009088699 | 7/2009 |
| WO | 2009087115 | 9/2009 |

OTHER PUBLICATIONS

Composite Systems, Inc. PFE_Technology, 2003, 2 pages.
European Search Report for European Application No. EP 10186688, dated Apr. 6, 2011, 9 pages.

(56) References Cited

OTHER PUBLICATIONS

International Search Report for International Application No. PCT/US2004/024960, dated Dec. 13, 2004.
Notice of Reason for Rejection, Japanese Office Action for Japanese Patent Application No. 2006-522662, dated Jul. 16, 2009.
Non-final Office Action for U.S. Appl. No. 12/323,403, dated Sep. 2, 2009.
Non-final Office Action for U.S. Appl. No. 12/323,382, dated Dec. 23, 2009.
Examiner's Report for Canadian Application No. 2,698,272, dated Apr. 1, 2016, 4 pages.

* cited by examiner

RADIALLY EXTENDING COMPOSITE STRUCTURES

CROSS-REFERENCE TO RELATED APPLICATION

This application is a divisional of U.S. patent application Ser. No. 12/615,980, filed Nov. 10, 2009, now U.S. Pat. No. 9,662,841, issued May 30, 2017, the disclosure of which is hereby incorporated herein in its entirety by this reference.

BACKGROUND

In aerospace applications, there is a need for lightweight high-strength structures. To meet these requirements, fiber-reinforced composite materials are often used. Sometimes, the structures include radially extending parts. Laying up plies of material in forming radially extending parts leads either to the formation of defects such as wrinkles, which weakens the parts, or cannot be achieved since the fiber cannot be stretched radially. Darting can be used to lessen the formation of wrinkles and allow for radial changes, but darting itself weakens the part. This invention provides a method of laying up fiber plies in a radially extending part without darting and without the formation of wrinkles or necessity of darts.

For the reasons stated above and for other reasons stated below, which will become apparent to those skilled in the art upon reading and understanding the present specification, there is a need in the art for improved radially extending composite structures.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a composite structure is provided. The composite structure includes a radially extending part that is formed with ply layers. At least one of the ply layers used to form the radially extending part has fibers oriented at 17.5 to 27.5 degrees in relation to an edge of the ply layer.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout the figures and the specification.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide methods and apparatus for forming composite structures with radially extending parts without the need for darting and without the formation of wrinkles that can weaken the structure. In embodiments, plies of fiber having select orientations are laid up one at a time. Materials used to form the composite structures are generally described as ply layers. The ply layers can be made of any materials with fibers (or plies) that exhibit desired characteristics including, but not limited to, pre-preg material and dry fiber material. The pre-preg material and the dry fiber material can include, but are not limited to, tapes, woven fabrics, non-woven fabrics and non-crimp fabrics. The orientation of the fibers (or plies) within the materials are described further below. Example orientations of fibers in a ply layer are +22.5/−67.5 degrees or −22.5/+67.5 degrees. In fabric embodiments the fibers have at least two fiber orientations per layer. That is, two sets of fibers with orientations that are typically orientated 90 degrees apart from each other are present in fabric embodiments. For example, fiber orientations in a fabric include 22.5 and 112.5 degrees and −22.5 and 67.5 degrees. Due in part to variations in formed ply layers, the above examples of orientation degrees can vary. In some cases, the orientation degrees can vary up to 5 degrees or more. In a tape embodiment, the fibers have only one fiber orientation.

Figure 1:
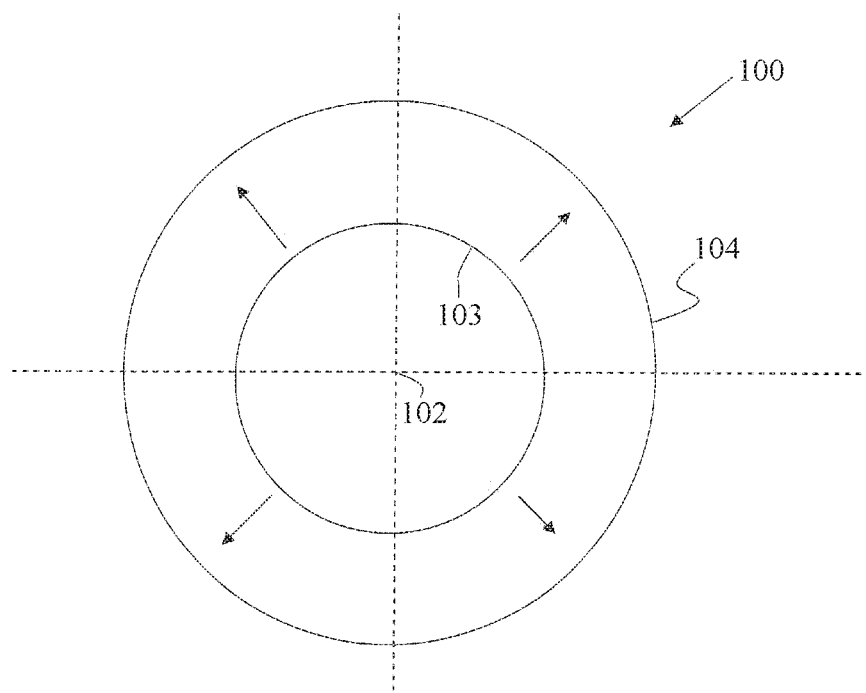
FIG. 1 is a top view of a radially extending part of one embodiment of the present invention.
Figures 2A, 2B:
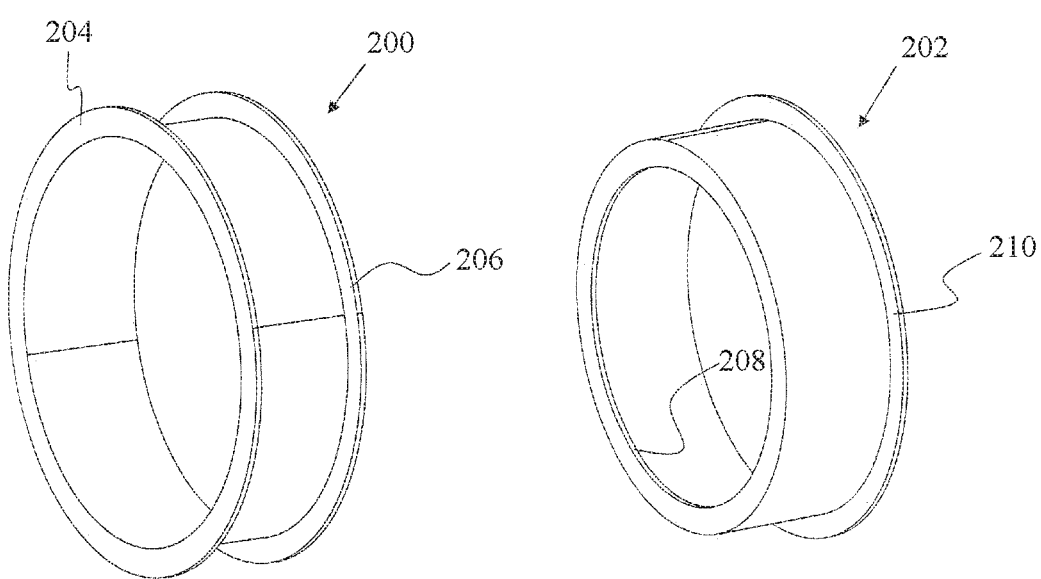
FIGS. 2A and 2B are side perspective views of composite structures having radially extending parts of another embodiment of the present invention.
Figure 3:
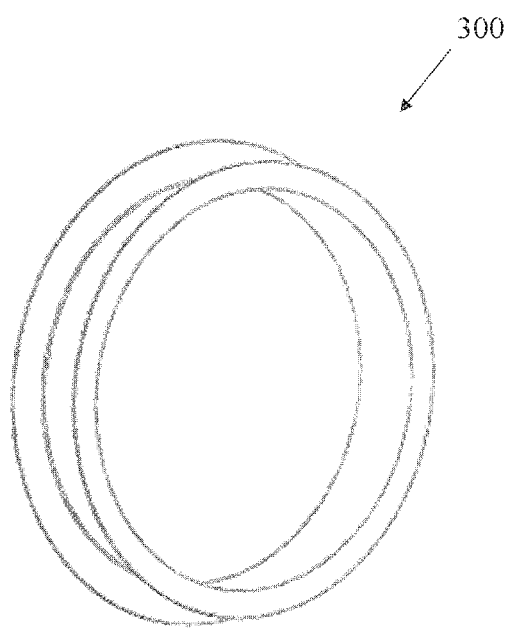
FIG. 3 is a side perspective view of a tool used to form composite structures of an embodiment of the present invention.

Referring to FIG. 1, an example of a radially extending composite structure 100 is provided. In particular, FIG. 1 illustrates a top view of a radially extending composite structure 100. The composite structure 100 in this example is annular shaped. As this example illustrates, the part extends radially about a center point 102 from an inner edge 103 to an outer edge 104 of the composite structure 100. FIGS. 2A and 2B further illustrate full circumference composite structures 200 and 202 that include radially extending parts 204, 206, 208, and 210, respectively. FIG. 3 illustrates an example of a tool 300 that can be used to form the full circumference composite structures 200 and 202, as shown in FIGS. 2A and 2B.

Figure 4A:
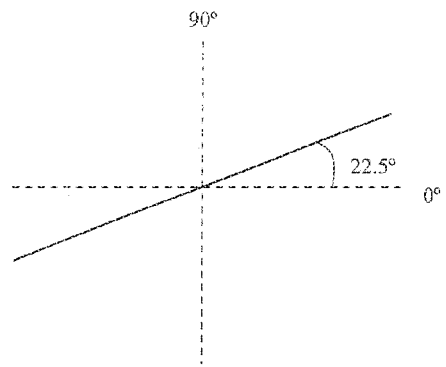
FIGS. 4A, 4B, 4C, and 4D illustrate possible fiber orientations of embodiments of the present invention.
Figure 4C:
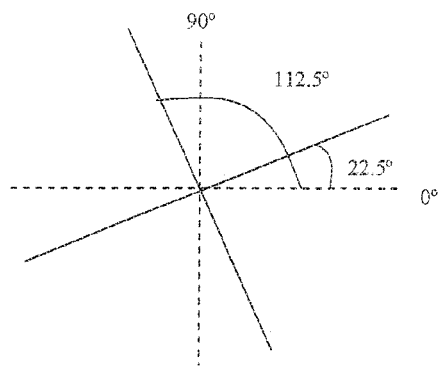
Figure 4B:
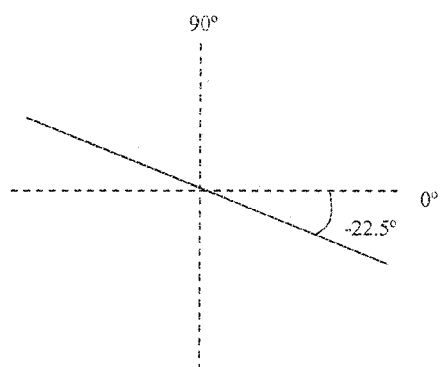
Figure 4D:
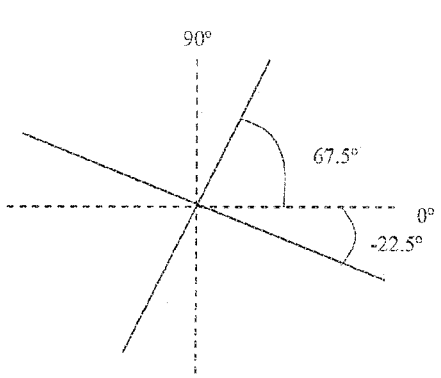

As discussed above, embodiments use specific fiber orientations in the ply layers. Examples of different orientations used in embodiments are provided in FIGS. 4A, 4B, 4C, and 4D. In particular, FIG. 4A illustrates a fiber orientation of 22.5 degrees. The 22.5 degrees is in relation to an edge of a ply layer that is further described below. The 0 degree line represents the edge of the ply layer. FIG. 4B illustrates a −22.5 degree orientation. The fiber orientations illustrated in FIGS. 4A and 4B would typically be used in ply layers of pre-preg and dry fiber tapes. FIG. 4C illustrates two orientations of fibers, 22.5 degrees and 112.5 degrees. FIG. 4D also illustrates two orientations of fibers, −22.5 degrees and 67.5 degrees. In particular, FIGS. 4C and 4D illustrate fibers in a fabric that have two sets of fibers each 90 degrees apart from each other.

Figure 5A:
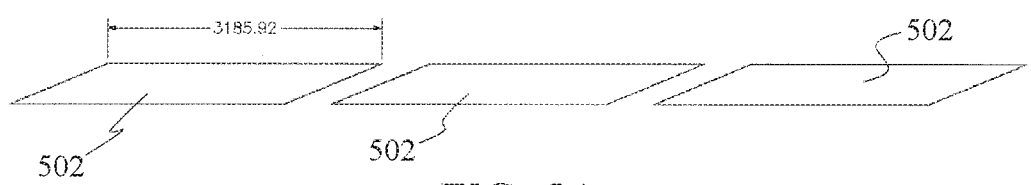
FIG. 5A is an illustration of patterned flags of one embodiment of the present invention.
Figure 5B:
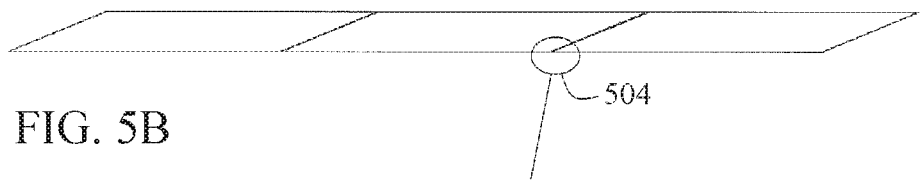
FIG. 5B is an illustration of spliced flags of one embodiment of the present invention.
Figure 5C:
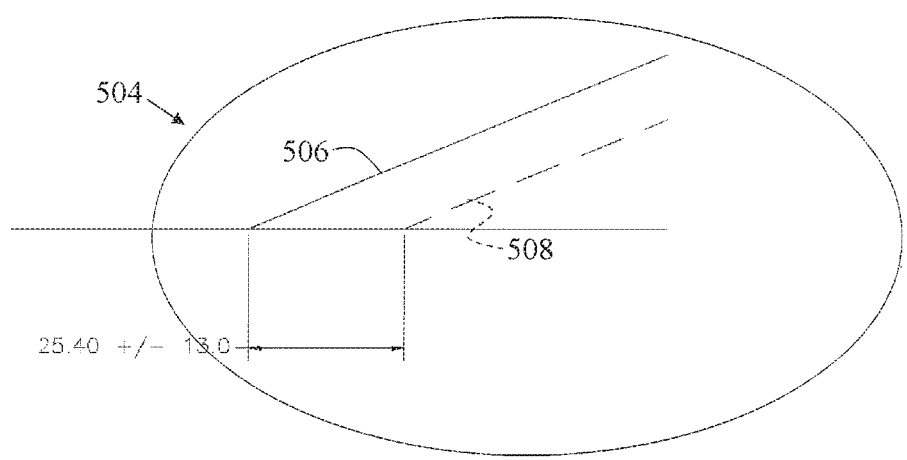
FIG. 5C is a close up view of a spliced area of FIG. 5B.
Figure 5D:
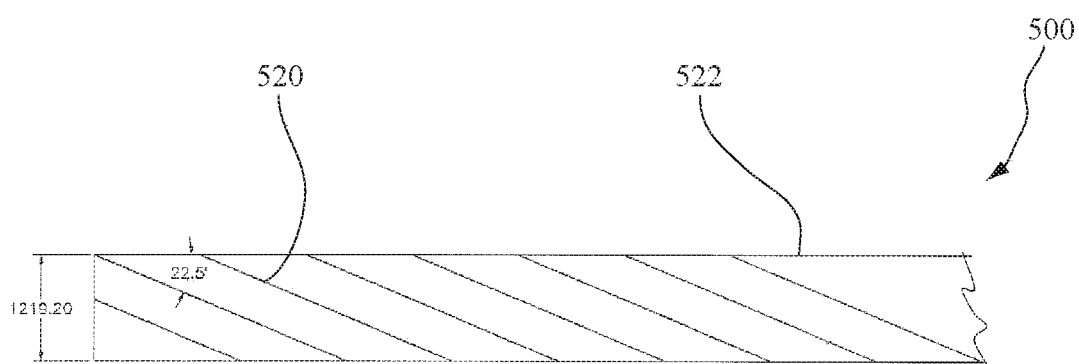
FIG. 5D is a top view of a produced layer of ply having a desired fiber orientation of one embodiment of the present invention.

Typically a stock supply roll of fibers is provided by suppliers in either a 90 degree orientation or a 0 degree orientation. However, the application of the 90 degree ply or 0 degree ply on radially extending parts requires darting (cut out sections) to the radius of the part. In embodiments of the present invention, ply rolls of material are made from the stock rolls to a desired orientation that does not require darting. Referring to FIG. 5A, patterned cut flags 502 of material that have been pattern cut out of a supply roll to have a desired fiber orientation are illustrated. The patterned cut flags 502 having the desired fiber orientation are then spliced together as illustrated in FIG. 5B. In one embodiment, the flags 502 are lined up with the ends overlapping as illustrated in the close up view of area 504, which is illustrated in FIG. 5C. The amount of the overlap is a function of the design requirements. For example, overlap is 0.5 inch. In some designs, this overlap ensures that the load in a given ply 506 can be transferred in shear to an adjacent play 508 subject to the strength of the resin used. Splice locations are staggered when laying up plies on a tool so they do not overlap. In embodiments, where no overlap is desired, the flags 502 are butt-spliced. In this embodiment, an additional ply can be added to the lay-up to compensate for the discontinuous material. As long as the splices are staggered, there is always the same number of continuous plies to carry the load. FIG. 5D is a top view of a ply layer illustrating a produced ply layer 500 having a fiber orientation of 22.5 degrees. It will be understood, that lines 520 representing fibers are only provided to illustrate the fiber orientation in relation to an edge 522 of the ply layer 500. Fibers in an actual ply layer would be relatively close to each other.

Figure 6:
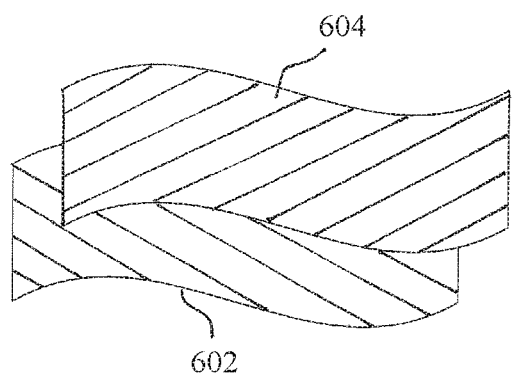
FIG. 6 illustrates an orientation of fibers in adjacent ply layers of one embodiment of the present invention.
Figure 7:
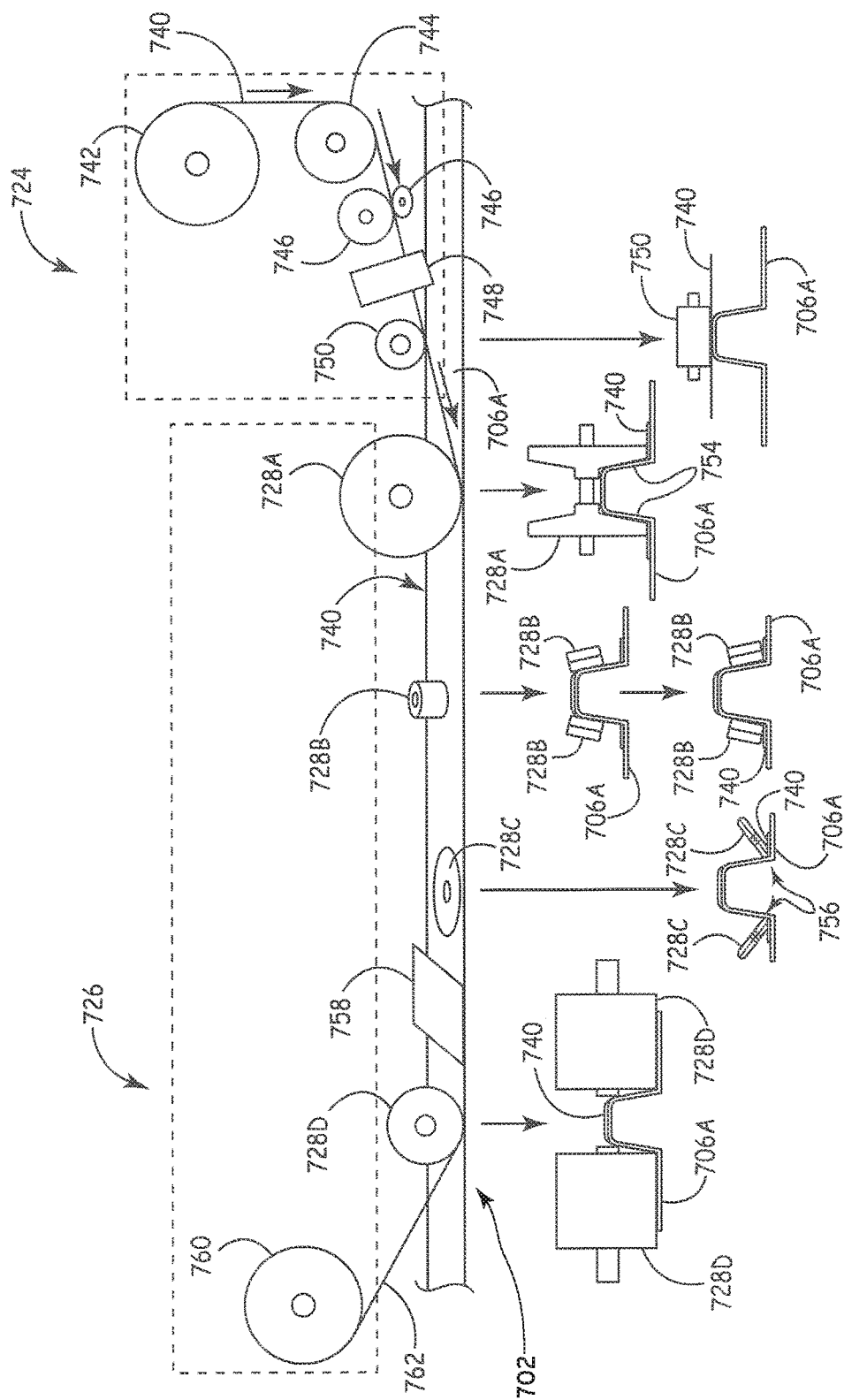
FIG. 7 is an illustration of a forming head of an embodiment used to form ply layers.

In embodiments, composite structures are created by ply layers formed on a tool one ply at a time. In one embodiment, ply layers having alternating fiber orientations are used to form the composite structure. For example, in one embodiment, alternating ply layers having orientations of +22.5/−67.5 degrees and −22.5/+67.5 degrees are used to form the radially extending composite structures. An example of alternating ply layers 602 and 604 having orientations of +22.5/−67.5 degrees and −22.5/+67.5 degrees is illustrated in FIG. 6. One method of applying and forming ply layers on a tool is with a forming head 726 and automatic ply feeder (dispensing device) 724. An example of a forming head can be found in commonly assigned U.S. Pat. No. 7,513,769 (Benson et al.) filed on Jul. 30, 2004, titled "Apparatus and Methods for Forming Composite Stiffeners and Reinforcing Structures," which is herein incorporated by reference. In particular, FIG. 7 provides an exemplary example of the material dispensing device 724 and the forming head 726. Material 740 (e.g., a ply layer or pre-preg cloth) having the desired fiber orientation is fed from a supply and tension roller 742 and over a redirect roller 744 as motivated by a pair of feed rollers 746. The material 740 passes beyond a cutting device 748 that may be used to cut the material 740 to a specified length, width, or both, such as described hereinabove with respect to other embodiments of the present invention. The material 740 is then disposed onto a portion of a tool 706A by a tack roller 750.

It is noted that the tack roller 750 (and subsequent rollers encountered by the material 740) is shown in a first elevational view with a second, rotated elevational view depicted immediately therebeneath to provide additional understanding of how the material 740 is being shaped by the interaction of various rollers with the material 740 and the underlying tool 706A.

The forming head 726 includes a plurality of rollers 728A-728D used to shape and debulk the material 740 disposed over the tool 706A (or over previously shaped material plies disposed on the tool 706A). Thus, for example, a first roller 728A engages the tool 706A to generally conform the material 740 to the shape of the tool 706A. Second, a set of rollers 728B may be used to press the material 740 against the side walls 754 of the tool 706A. If desired, this may be accomplished with multiple sets of rollers 728B working from an upper portion of the tool 706A to a bottom portion as depicted in the rotated elevational views of the rollers 728B. Another set of rollers 728C may be used to press the material 740 into interior lower corners 756 of the tool 706A. A squeegee 758 (or shoe) may be used to help pull wrinkles from the material 740 at one or more intermediate locations among the rollers 728A-728D. Finally, a set of rollers 728D may be used to press and form the flange members of a composite structure 702.

It is noted that the process of forming the composite structure 702 includes forming, shaping and debulking the material 740 from the inside out. In other words, the tack roller 750 applies pressure to the tool 706A and material 740 disposed thereon at the center, with subsequent rollers 728A-728D each sequentially applying pressure at a location further toward the outer edges of the material 740. Such a process has been determined to be efficient and effective in removing wrinkles and air gaps between laminar plies of material, thereby producing a highly consolidated and debulked composite member.

A take-up roller 760 may be associated with the forming head 726 (or independently coupled with the carriage assembly) to collect carrier material 762 (also referred to as backing), which may be disposed on a surface of, for example, a pre-preg material used to form the composite structure 702. The carrier material 762, which may include a suitable polymer material, not only keeps the pre-preg material from adhering to itself when in rolled form 742 (i.e., such as, when on the supply and tension roller) but also may remain on the material 740 while the material 740 is being shaped, formed and debulked so that the various rollers 750 and 728A-728D do not stick to the material 740 or collect and build-up resin of a surface thereof. Additionally, the presence of such carrier material 762 may serve to protect the material 740 used to form a composite structure 702 when the various rollers 728A-728D press and rub against the material 740 during forming of the composite structure 702.

Figure 8:
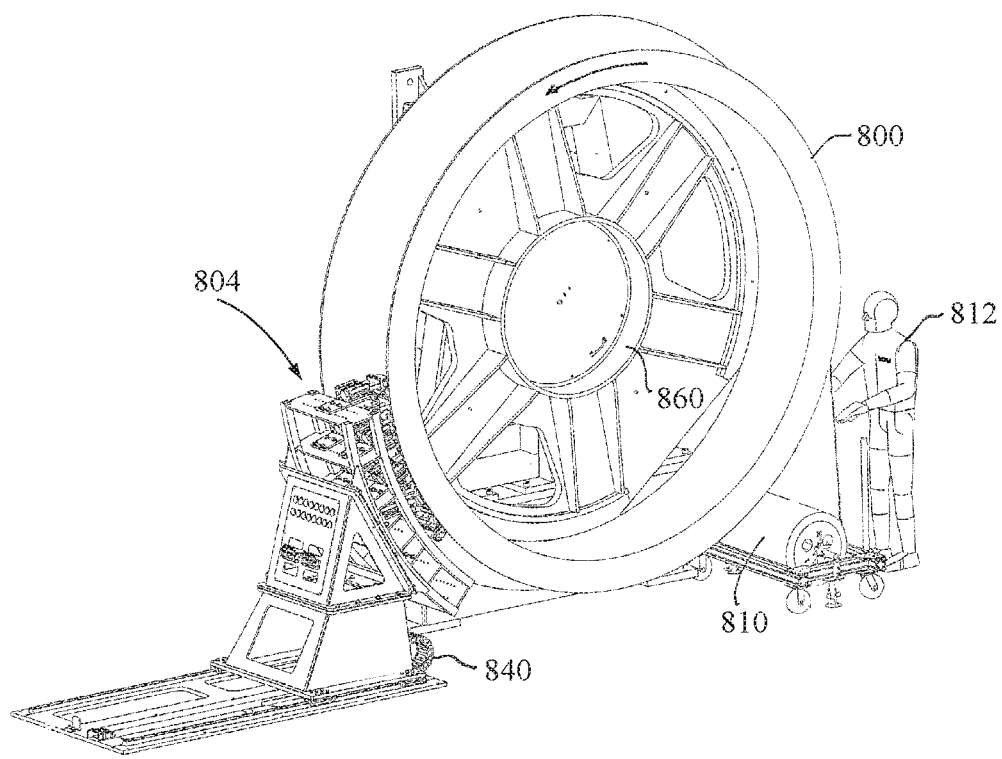
FIG. 8 is a forming machine used to form composite structures of one embodiment of the present invention.

Another example of a forming head 804 used to form ply layers is illustrated in FIG. 8. Forming head 804 is part of a composite forming system disclosed in commonly assigned patent application Ser. No. 12/615,908, filed Nov. 10, 2009, now U.S. Pat. No. 8,282,757, issued Oct. 9, 2012, titled "Automated Composite Annular Structure Forming," which is incorporated in its entirety herein. FIG. 8 illustrates a tool 800 that is mounted on a tool holding assembly 860 that is in turn rotationally coupled to a tool holding support. Ply layers are applied and then formed on the tool 800 in this embodiment. As illustrated, the tool 800 rotates in relation to a tool holding support as an operator 812 applies the material (ply layer) 810 to the tool 800. The forming head 804, which includes forming rollers, forms the ply layer 810 on the tool 800. Once, the ply layers 810 have been formed, the forming head 804 is pulled back from the tool 800 via track 840. The tool 800, with the formed ply layers 810, can then be removed for curing to form a composite structure. For example, tool 800 forms a composite structure such as composite structures 200 and 202, as shown in FIGS. 2A and 2B that have radially extending parts 204, 206, 208, and 210, respectively. Embodiments are not limited to specific cross-sectional geometries of formed composite structures. Any geometry that includes radially extending parts has application.

Figure 9:
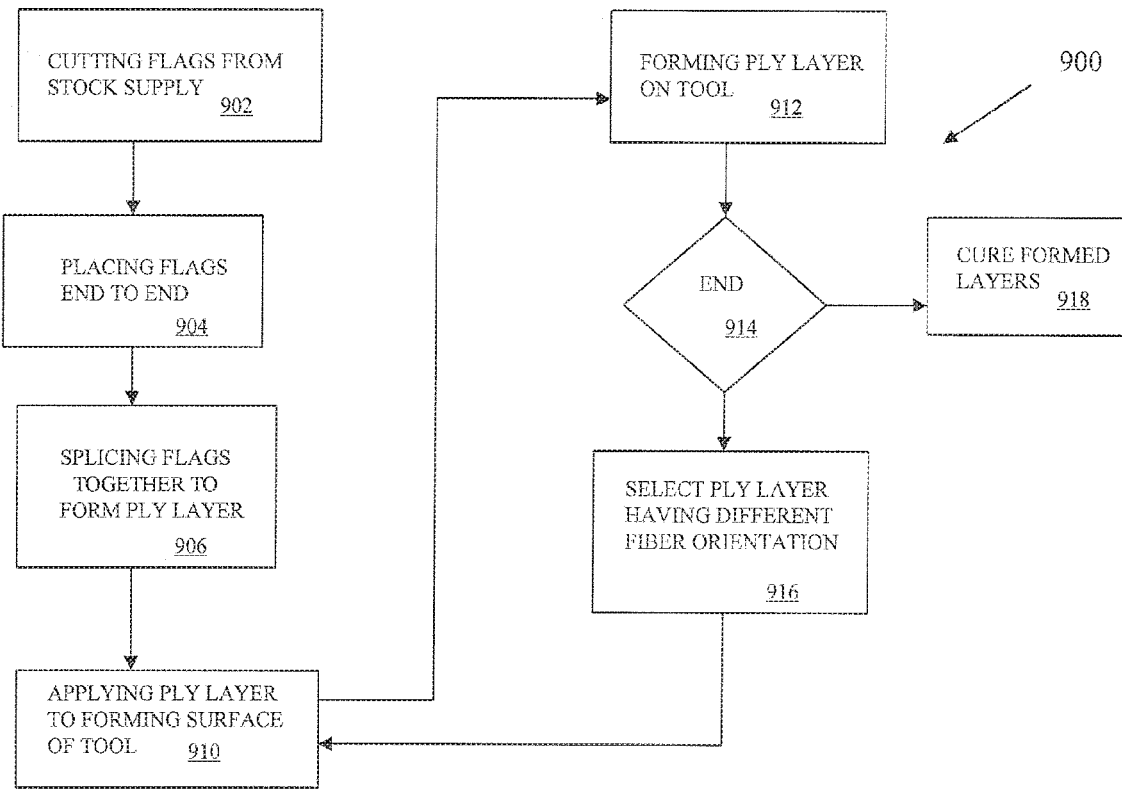
FIG. 9 illustrates a formation flow diagram of one embodiment of the present invention.

Referring to FIG. 9, a formation flow diagram 900 of a composite structure of an embodiment is illustrated. As discussed above, the process starts by making a ply layer. This process involves cutting flags from a stock supply having a desired orientation (902). The flags are then lined up end to end (904) and spliced together (906) to form the ply layer. The ply layer is then applied to a forming surface of a tool or mandrel (910). The ply layer on the tool is then formed on the forming surface of the tool (912). It is then determined if more ply layers are required to form the composite structure (914). If more ply layers are required (914), a ply layer having a desired fiber orientation is selected (916). As discussed above, in some embodiments it is desired to alternate the fiber orientations between adjacent ply layers. Once, the ply layer with the desired orientation has been selected (916) it is applied to the forming surface of the forming tool (910). Hence, ply layers are formed one at a time over each other until a desired number of layers have been reached (914). Once, it is determined the ply layering is complete at (914), the formed ply layers on the tool are then cured (918) to form the desired composite structure.

Although specific embodiments have been illustrated and described herein, it will be appreciated by those of ordinary skill in the art that any arrangement, which is calculated to achieve the same purpose, may be substituted for the specific embodiments shown. For example, slight variations in orientation of the fibers could be implemented with the same result. Hence, variations of 5 degrees or more may be possible. This application is intended to cover any adaptations or variations of the present invention. Therefore, it is manifestly intended that this invention be limited only by the claims and the equivalents thereof.

What is claimed is:

1. A method of forming a composite structure having a radially extending portion in an at least partially automated process, the method comprising:

applying ply layers one at a time on a forming surface of a tool configured to form a composite structure, the tool having an annular portion extending in an axial direction around a centerline and comprising a cylinder and at least one radially extending part extending outward from the annular portion in a direction about an axis transverse to the centerline of the annular portion, wherein at least one ply layer of the ply layers each individually, and before being applied to the composite structure, comprises a plurality of flags of fiber-reinforced material, the plurality of flags each being positioned proximate another flag of the plurality of flags in a substantially end to end configuration to define a major length of the at least one ply layer having fibers in at least some matrix material oriented at a common angle offset from an edge of the at least one ply layer, the plurality of flags of the at least one ply layer each being adhered to a common removable backing material;

extending the at least one ply layer over the forming surface of the tool from the annular portion, through an interface between the annular portion and the at least one radially extending part, and radially outward over the at least one radially extending part;

conforming the ply layers over the forming surface of the tool; and curing the conformed ply layers to form the composite structure.

2. The method of claim 1, further comprising orienting the fibers in the at least one ply layer of the ply layers at 17.5 to 27.5 degrees in relation to an edge of the at least one ply layer.

3. The method of claim 1, further comprising orienting the fibers in the at least one ply layer of the ply layers at 62.5 to 72.5 degrees in relation to an edge of the at least one ply layer.

4. The method of claim 1, further comprising producing material for the at least one ply layer by applying the plurality of flags on a removable backing material.

5. The method of claim 4, wherein producing the material, further comprises:

pattern cutting the plurality of flags from a stock supply of material to achieve a desired fiber orientation;

placing the plurality of flags end to end; and splicing the plurality of flags together to form the at least one ply layer having the desired fiber orientation.

6. The method of claim 5, further comprising overlapping ends of the plurality of flags when splicing the plurality of flags together.

7. The method of claim 1, wherein applying the ply layers to the tool further comprises applying the at least one ply layer over the forming surface of the tool so that spliced ends of flags of adjacent ply layers do not align.

8. The method of claim 1, further comprising butt-splicing at least one flag of the plurality of flags with at least one adjacent flag of the plurality of flags.

9. The method of claim 1, further comprising gradually increasing and expanding spacing between the fibers in a portion of the at least one ply layer on the at least one radially extending part as the at least one ply layer extends toward a radially outer edge of the at least one radially extending part.

10. The method of claim 1, further comprising angularly offsetting fiber orientations of the at least one ply layer with at least one other ply layers in the ply layers.

11. The method of claim 1, further comprising extending the at least one ply layer continuously along the annular portion and the at least one radially extending part without an area within outer edges of each flag of the plurality of flags of the at least one ply layer having been cut before or during layup of the at least one ply layer.

12. The method of claim 1, further comprising selecting the at least one ply layer to comprise a dry fiber material.

13. A method of forming a composite structure having a radially extending portion, the method comprising:

applying ply layers in an at least partially automated process on a forming surface of a tool configured to form a composite structure, the tool having a first portion comprising a cylinder extending in a direction along a centerline and at least one radially extending part extending outward from the first portion in a direction along an axis transverse to the centerline of the first portion, wherein at least one ply layer of the ply layers comprises, before being applied to the forming surface of the tool, a plurality of flags of fiber-reinforced material, the plurality of flags each being positioned proximate another flag of the plurality of flags to define the at least one ply layer having fibers in at least some matrix material oriented at an angle offset from an edge of the at least one ply layer;

extending the at least one ply layer over the forming surface of the tool from the first portion, through an interface between the first portion and the at least one radially extending part, and radially outward over the at least one radially extending part; and consolidating the ply layers to form the composite structure.

14. The method of claim 13, wherein applying the ply layers comprises laying up a plurality of dry fiber materials.

15. The method of claim 13, further comprising fabricating the at least one ply layer of the ply layers prior to the at least one ply layer being applied to the tool, comprising:

pattern cutting the plurality of flags of fiber-reinforced material from a stock supply of material to achieve a desired fiber orientation; and placing the plurality of flags end to end on a backing material to form the at least one ply layer having the desired fiber orientation.

16. The method of claim 13, further comprising extending another ply layer of the ply layers over a second radially extending part of the tool.

17. The method of claim 13, further comprising staggering splices between flags of adjacent ply layers on the tool.

18. A method of forming a composite structure having a radially extending portion, the method comprising:

applying ply layers in an at least partially automated process on a forming surface of a tool configured to form a composite structure, the tool having a body portion extending in a direction along a longitudinal axis and at least one radially extending part extending outward from the body portion in a direction along an axis transverse to the longitudinal axis of the body portion, wherein at least one ply layer of the ply layers comprises a fiber-reinforced material having fibers oriented at an angle offset from an edge of the at least one ply layer;

selecting the at least one ply layer of the ply layers to comprise a plurality of flags of fiber-reinforced material, the plurality of flags each being positioned proximate another flag of the plurality of flags and adhered to common backing material to define an individual length the at least one ply layer; and extending the at least one ply layer over the forming surface of the tool from a body portion, through an interface between the body portion and the at least one radially extending part, and radially outward over the at least one radially extending part.

19. The method of claim 18, further comprising extending another ply layer of the ply layers from the body portion to and over a second radially extending part of the tool.

* * * * *